(12) United States Patent
Stafford et al.

(10) Patent No.: US 10,684,485 B2
(45) Date of Patent: Jun. 16, 2020

(54) TRACKING SYSTEM FOR HEAD MOUNTED DISPLAY

(71) Applicant: Sony Interactive Entertainment Inc., Tokyo (JP)

(72) Inventors: Jeff Stafford, Redwood City, CA (US); Dominic Mallinson, Redwood City, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/726,341

(22) Filed: May 29, 2015

(65) Prior Publication Data

US 2016/0260251 A1    Sep. 8, 2016

Related U.S. Application Data

(60) Provisional application No. 62/129,733, filed on Mar. 6, 2015.

(51) Int. Cl.
*G02B 27/01* (2006.01)
*G06T 19/00* (2011.01)

(52) U.S. Cl.
CPC ..... *G02B 27/0179* (2013.01); *G02B 27/0101* (2013.01); *G02B 27/017* (2013.01); *G06T 19/006* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| 4,710,020 A | 12/1987 | Maddox et al. |
| 5,912,700 A | 6/1999 | Honey et al. |
| 6,088,017 A | 7/2000 | Tremblay |

(Continued)

FOREIGN PATENT DOCUMENTS

| JP | H07306956 A | 11/1995 | |
| JP | 2005050189 A | 2/2005 | |
| JP | 2015056824 A | * 3/2015 | ........... H04N 13/344 |

OTHER PUBLICATIONS

ISR and Written Opinion PCT/US2016/016653, dated May 13, 2016, 3 pages.

(Continued)

*Primary Examiner* — YuJang Tswei
(74) *Attorney, Agent, or Firm* — Penilla IP, APC

(57) ABSTRACT

A system and method of tracking a location of a head mounted display and generating additional virtual reality scene data to provide the user with a seamless virtual reality experience as the user interacts with and moves relative to the virtual reality scene. An initial position and pose of the HMD is determined using a camera or similar sensor mounted on or in the HMD. As the HMD is moved into a second position and pose, images of two or more fixed points are captured by the camera or sensor to determine a difference in position and pose of the HMD. The difference in position and pose of the HMD is used to predict corresponding movement in the virtual reality scene and generate corresponding additional virtual reality scene data for rendering on the HMD.

11 Claims, 13 Drawing Sheets

(56) References Cited

U.S. PATENT DOCUMENTS

| | | |
|---|---|---|
| 6,152,854 A | 11/2000 | Carmein |
| 6,609,797 B2 | 8/2003 | Ejiri et al. |
| 6,646,251 B1 | 11/2003 | Okamoto |
| 6,952,003 B2 | 10/2005 | Skurnik et al. |
| 7,075,661 B2 | 7/2006 | Petty et al. |
| 7,451,633 B2 | 11/2008 | Bang et al. |
| 7,626,569 B2 | 12/2009 | Lanier |
| 7,729,515 B2 | 6/2010 | Mandella et al. |
| 7,996,097 B2 | 8/2011 | Dibernardo et al. |
| 8,314,770 B2 | 11/2012 | Deliwala |
| 8,791,901 B2 | 7/2014 | Mallinson |
| 9,215,293 B2 | 12/2015 | Miller |
| 2002/0036779 A1 | 3/2002 | Kiyoi et al. |
| 2002/0085097 A1 | 7/2002 | Colmenarez et al. |
| 2002/0131052 A1 | 9/2002 | Emery |
| 2002/0131056 A1 | 9/2002 | Fujii et al. |
| 2002/0194914 A1 | 12/2002 | Foxlin et al. |
| 2003/0158699 A1 | 8/2003 | Townsend et al. |
| 2003/0233870 A1 | 12/2003 | Mancevski |
| 2003/0234823 A1 | 12/2003 | Sato et al. |
| 2004/0233461 A1 | 11/2004 | Armstrong et al. |
| 2004/0252102 A1 | 12/2004 | Wilson et al. |
| 2005/0086243 A1 | 4/2005 | Abbott et al. |
| 2005/0213082 A1 | 9/2005 | DiBernardo et al. |
| 2006/0033713 A1 | 2/2006 | Pryor |
| 2006/0047427 A1 | 3/2006 | Weed et al. |
| 2006/0284979 A1 | 12/2006 | Clarkson |
| 2007/0273610 A1 | 11/2007 | Baillot |
| 2008/0297437 A1 | 12/2008 | Hiroshi |
| 2009/0066725 A1 | 3/2009 | Nogami et al. |
| 2010/0245237 A1 | 9/2010 | Nakamura |
| 2012/0062551 A1* | 3/2012 | Lee .................. H04N 13/122 345/419 |
| 2012/0194517 A1* | 8/2012 | Izadi .................. G06T 17/00 345/420 |
| 2012/0262558 A1* | 10/2012 | Boger .............. G02B 27/0093 348/61 |
| 2013/0016070 A1* | 1/2013 | Starner .............. G02B 27/017 345/175 |
| 2014/0160162 A1 | 6/2014 | Balachandreswaran |
| 2014/0337724 A1 | 11/2014 | Tremblay et al. |
| 2016/0180574 A1* | 6/2016 | Kaminitz ................ G06F 3/01 345/633 |

OTHER PUBLICATIONS

IST and Written Opinion PCT/US2016/017401, dated May 11, 2016, 4 pages.

ISR and Written Opinion PCT/US2012/30478, dated Jul 24, 2012, 11 pages.

Notification of Reason(s) for Refusal, dated Mar. 26, 2019, issued in corresponding Japanese Patent Application No. 2017-546784 (5 total pages).

Umeda, Kazuyoshi, "Study of utilization of relative parallax images in planar area detection," CD-ROM commemorating the 20th anniversary of the Robotics Society of Japan 2002, The Robotics Society of Japan, Oct. 12, 2002, pp. 1-2 (with partial English translation).

\* cited by examiner

TRACKING SYSTEM FOR HEAD MOUNTED DISPLAY

CROSS REFERENCE TO RELATED APPLICATIONS

This application claims priority from U.S. Provisional Patent Application No. 62/129,733 filed on Mar. 6, 2015 and entitled "Tracking System for Head Mounted Display," which is incorporated herein by reference in its entirety.

TECHNICAL FIELD

The present invention relates generally to virtual environments, and more particularly, to methods and systems for interfacing with virtual objects in the context of wearing and using a head mounted display (HMD).

DESCRIPTION OF RELATED ART

One of the rapidly growing technologies in the field of human-computer interaction is various head-mounted displays (HMDs), which may be worn on a user's head and which have one or two displays in front of the one or two of the user eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

Although much advancement has occurred in the HMD field, the technology still needs advancement to bring physical reality to real user interactions with virtual objects rendered in virtual environments presented in HMDs.

It is in this context that the following embodiments arise.

SUMMARY

Broadly speaking, the present invention fills these needs by providing a system and method for dynamically locating the HMD in a real environment around a user while the user interacts with the virtual environment will now be described. It should be appreciated that the present invention can be implemented in numerous ways, including as a process, an apparatus, a system, computer readable media, or a device. Several inventive embodiments of the present invention are described below.

One embodiment provides a virtual reality system including a head mounted display coupled to a computing device capable of generating the virtual reality environment including multiple virtual reality scenes that are rendered and displayed on the HMD. The computing device can include an input device interface for receiving input from a user input device or the HMD. The input device interface processes instructions to select content for display in the HMD. The computing device can also include a virtual reality space generation module for rendering the selected content in the HMD in a form of a virtual reality scene and an HMD movement module. The HMD movement module for tracking movement of the HMD in a real space and for identifying a first position and pose of the HMD in the real space, the HMD movement module providing HMD position and pose change data to the virtual reality space generation module for rendering additional content of the virtual reality scene corresponding to a second position and pose of the HMD in the real space.

The virtual reality system can also include a real space mapping system coupled to the computing device. The real space mapping system includes a light source for projecting a multiple points of light across at least a portion of the real space and a camera for capturing an image of the points of light. The camera can be integrated with the HMD or affixed to the user or a user input device such as a controller. The second position and pose of the HMD can be determined by the HMD movement module using the fixed points from the image captured by the camera. The HMD movement module is capable of analyzing the image captured by the camera to identify multiple fixed points in the real space. The fixed points can include at least a portion of the points of light in one implementation. In another implementation, the can include at least a portion of multiple identified points disposed on one or more fixed objects present in the real space.

Providing HMD position and pose change data can include identifying the HMD in the first position and pose, selecting at least two of the fixed points, determining a first relative distance between the selected fixed points with the HMD in the first position and pose, identifying the HMD in the second position and pose, determining a second relative distance between the selected fixed points with the HMD in the second position and pose and comparing the first relative distance and the second relative distance to determine the HMD position and pose change data equal to a difference between the first position and pose and the second position and pose.

The virtual reality space generation module can continually generate the additional content for the HMD depending on at least one position and pose that the HMD is moved toward while rendering the virtual reality scene. Analyzing the image or multiple images captured by the camera is used to detect a location of the HMD in real space, wherein the location of the HMD in real space is translated to a location of the HMD in the virtual reality scene, wherein the HMD is used to identify interactions between the user input device and a virtual object in the virtual reality scene.

The light source can be stationary, fixed location in the real space or, alternatively, the light source can be movable such as affixed to the HMD or the user input device or otherwise movable by the user as the user interacts with the virtual scene displayed in the HMD. The light source can project the points of light in a human-visible spectrum of light or in a non-human visible spectrum of light such as ultraviolet or infrared.

Another embodiment provides a method tracking a head mounted display (HMD) used for rendering a virtual reality scene, the HMD including a display screen for rendering the virtual reality scene. The method includes capturing image data using at least one device integrated on an external surface of the HMD, the image data capturing a real space in which the HMD is located. The image data is processed to identify at least two points of light projected upon a surface in the real space. The capturing and the processing to identify changes in location of the at least two points of light in the captured image data continues. The changes in location identifying position and pose changes by the HMD in the real space. The position and pose changes are configured to automatically control rendering adjustments to the virtual reality scene rendered on the display screen of the HMD, the adjustments including one or both of changes in a view perspective into of the virtual reality scene and rendering of additional content for the virtual reality scene.

Continuing the capturing of image data is performed at a frame rate that continues while the tracking of the HMD is occurring.

The at least one device integrated on the external surface of the HMD for capturing image data can be one of a red-green-blue (RGB) camera, an infrared (IR) camera, a video camera, or a position sensing device (PSD). The at least one device can be a camera and the external surface can be part of a housing of the HMD or a strap of the HMD. Inertial data from an inertial sensor in the HMD can also be used during the position and pose changes in the real space, the inertial data generated on the HMD to provide an additional tracking variable usable when automatically controlling rendering adjustments.

Another embodiment includes a head mounted display (HMD). The HMD includes a housing including a screen for displaying images associated with a virtual reality scene. A sensing device is integrated on an external surface of the housing. A processor for controlling capturing of image data captured by the sensing device is also included. The image data capturing a real space in which the HMD is located along with at least two points of light detected to be projected by an emitter onto a surface of the real space or at least two fixed points in the real space. The processor is configured to continually transfer the image data to a computing device during position tracking of the HMD in the real space. The processor is configured to identify changes in position and pose of the HMD based on changes in location of the at least two points of light of the at least two fixed points in the image data. The processor can also receive content for the virtual reality scene to be rendered on the screen based on the identified changes in position and pose. The changes in position and pose cause automatic adjustments to one or both of a view perspective into of the virtual reality scene and rendering of additional content for the virtual reality scene.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for dynamically locating the HMD in a real environment around a user while the user interacts with the virtual environment will now be described. It will be apparent to those skilled in the art that the present invention may be practiced without some or all of the specific details set forth herein.

One approach to locating multiple objects in the real environment around the user while the user interacts with the virtual environment is to project multiple spots of light on the various objects around the user. The multiple spots of light can be combined with one or more photographic and/or video views of the real environment around the user. A computer can use the light spots, in combination with the photographic and/or video views of the real environment around the user, as reference points to track moving objects and the user in the real environment. The light spots can be projected from one or more light sources. The light source(s) can be located on the head-mounted display (HMD), the computer, or in another peripheral device coupled to the computer such as a camera or a dedicated light source. The light spots can be manually or automatically selected for tracking objects in the real environment. The number of selected light spots can be determined manually or automatically. Increasing the number of selected light spots can improve the accuracy of locating objects in the real environment. The light sources can include one or more lasers. One advantage of using lasers is that determining or otherwise obtaining the focal distance to the projected surface may not be needed.

Figure 1:
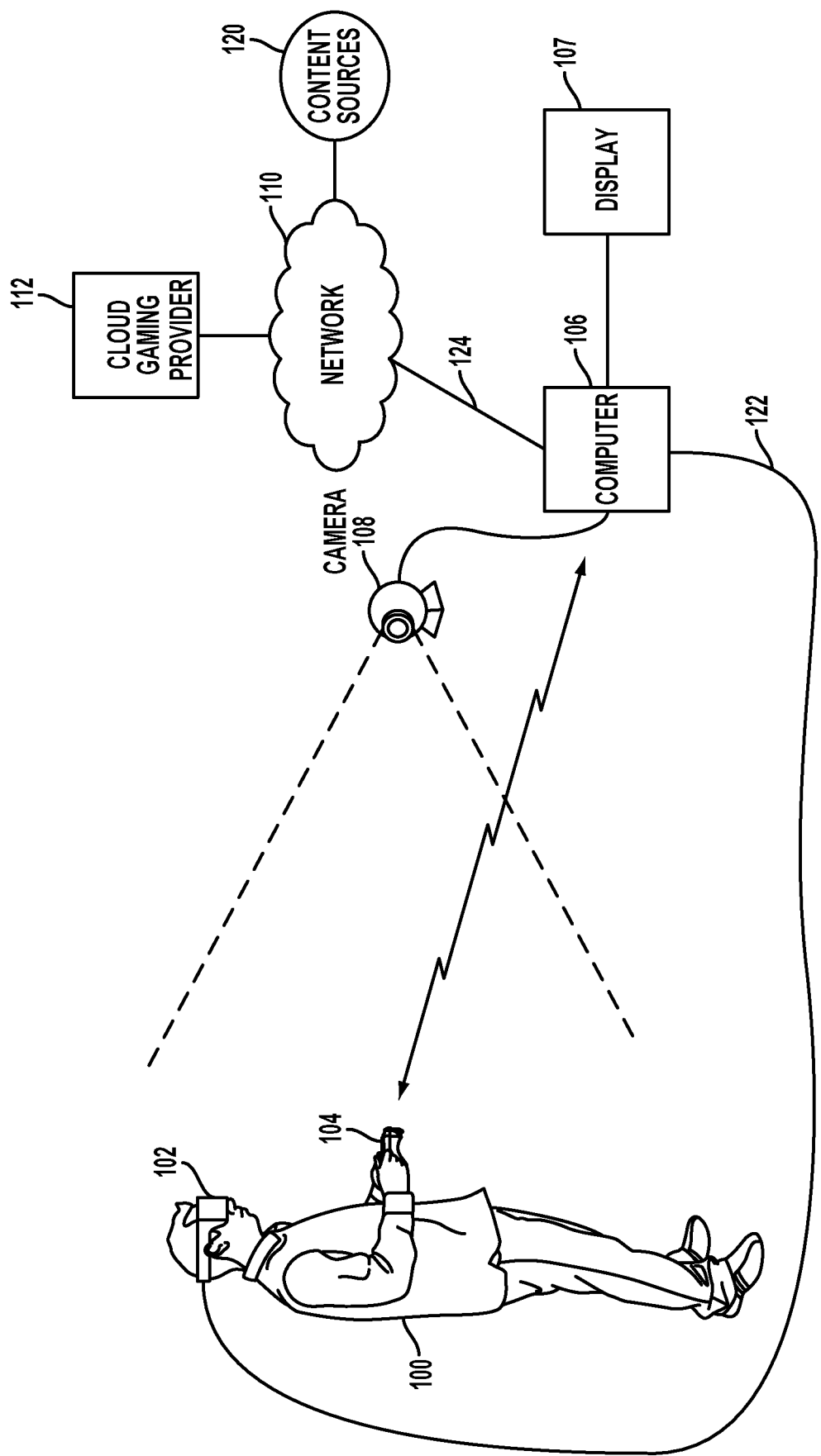
FIG. 1 illustrates a system for interactive gameplay of a video game, in accordance with the disclosed embodiments.

FIG. 1 illustrates a system for interactive gameplay of a video game, in accordance with the disclosed embodiments. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 may provide display regions to each of the user's eyes which occupy large portions or even the entirety of the field of view of the user. The HMD display screen can have a refresh rate of about 30 to about 500 frames per second (Hz). In one implementation, the HMD display screen can have a selectable refresh rate of about 60 or about 120 Hz.

In one embodiment, the HMD 102 may be connected to a computer 106. The connection 122 to computer 106 may be wired or wireless. The computer 106 may be any general or special purpose computer, including but not limited to, a gaming console, personal computer, laptop, tablet computer, mobile device, cellular phone, tablet, thin client, set-top box, media streaming device, etc. In some embodiments, the HMD 102 may connect directly to a network 110 such as the internet, which may allow for cloud gaming without the need for a separate local computer. In one embodiment, the computer 106 may be configured to execute a video game (and other digital content), and output the video and audio from the video game for rendering by the HMD 102. The computer 106 is also referred to herein as a client system 106, which in one example is a video game console.

The computer 106 may, in some embodiments, be a local or remote computer, and the computer may run emulation software. In a cloud gaming embodiment, the computer 106 is remote and may be represented by multiple computing services that may be virtualized in data centers, wherein game systems/logic may be virtualized and distributed to user over a network 110.

The user 100 may operate a controller 104 to provide input for the video game. In one example, a camera 108 may be configured to capture image of the interactive environment in which the user 100 is located. These captured images may be analyzed to determine the location and movements of the user 100, the HMD 102, and the controller 104. In one embodiment, the controller 104 includes a light (or lights) which may be tracked to determine its position/location and pose. Additionally, as described in further detail below, the HMD 102 may include one or more lights 200A-K which may be tracked as markers to determine the position and pose of the HMD 102 in substantial real-time during game play.

The camera 108 may include one or more microphones to capture sound from the interactive environment. Sound captured by a microphone array may be processed to identify the location of a sound source. Sound from an identified location may be selectively utilized or processed to the exclusion of other sounds not from the identified location. Furthermore, the camera 108 may be defined to include multiple image capture devices (e.g. stereoscopic pair of cameras), an IR camera, a depth camera, and combinations thereof.

In some embodiments, computer 106 may execute games locally on the processing hardware of the computer 106. The games or content may be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider 112, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104 or other input devices, e.g., gloves, clothes, the HMD 102, or combinations of two or more thereof.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections 124 to the network by the HMD 102, controller 104, and camera 108 may be wired or wireless. In some embodiments, content executed on the HMD 102 or displayable on a display 107, may be obtained from any content source 120. Example content sources may include, for instance, internet websites that provide downloadable content and/or streaming content.

In some examples, the content may include any type of multimedia content, such as movies, games, static/dynamic content, pictures, social media content, social media websites, etc.

As will be described below in more detail, a user 100 may be playing a game on the HMD 102, where such content is immersive 3D interactive content. The content on the HMD 102, while the player is playing, may be shared to a display 107. In one embodiment, the content shared to the display 107 may allow other users proximate to the user 100 or remote to watch along with the user's play. In still further embodiments, another user viewing the game play of user 100 on the display 107 may participate interactively with player 100. For example, a user viewing the game play on the display 107 may control characters in the game scene, provide feedback, provide social interaction, and/or provide comments (via text, via voice, via actions, via gestures, etc.) which enables users that are not wearing the HMD 102 to socially interact with user 100, the game play, or content being rendered in the HMD 102.

Figure 2:
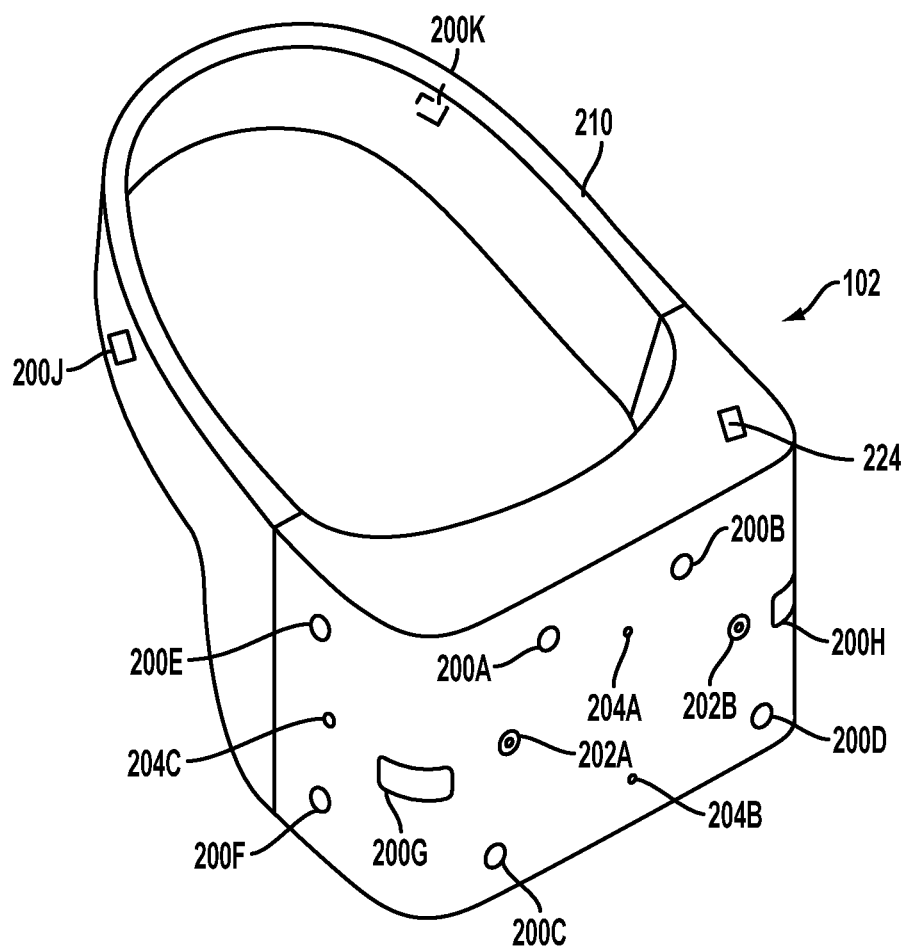
FIG. 2 illustrates a HMD, in accordance with the disclosed embodiments.

FIG. 2 illustrates a HMD 102, in accordance with the disclosed embodiments. As shown, the HMD 102 includes a plurality of lights 200A-K (e.g., where 200K and 200J are located toward the rear or backside of the HMD headband 210). Each of these lights may be configured to have specific shapes and/or positions, and may be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights may be identified in captured images of an interactive environment in which a user uses the HMD 102.

Based on identification and tracking of the lights, the position and pose of the HMD 102 in the interactive environment may be determined. It will further be appreciated that some of the lights 200A-K may or may not be visible depending upon the particular position and pose of the HMD 102 relative to an image capture device. Also, different portions of lights (e.g. lights 200G and 200H) may be exposed for image capture depending upon the position and pose of the HMD 102 relative to the image capture device. In some embodiments, inertial sensors are disposed in the HMD 102, which provide feedback regarding orientation, without the need for lights 200A-K. In some embodiments, the lights and inertial sensors work together, to enable mixing and selection of position/motion data.

In one embodiment, the lights may be configured to indicate a current status of the HMD 102 to others in the vicinity. For example, some or all of the lights 200A-K may be configured to have a certain color arrangement, intensity arrangement, be configured to blink, have a certain on/off configuration, or other arrangement indicating a current status of the HMD 102. By way of example, the lights 200A-K may be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights 200A-K might also be configured to indicate relative intensity levels of gameplay. For example, the intensity of lights 200A-K, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones 204A-C, sound from each of the microphones may be processed to determine the location of the sound's source. This information may be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment may be captured from the perspective of the HMD 102. Such video may be presented to the user to provide the user with a "video see-through" ability while wearing the HMD 102. That is, though the user cannot see through the HMD 102 in a strict sense, the video captured by the image capture devices 202A and 202B may nonetheless provide a functional equivalent of being able to see the environment external to the HMD 102 as if looking through the HMD 102.

Such video may be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera may be installed on the HMD 102, and oriented in any direction. For example, in another embodiment, there may be cameras mounted on the sides of the HMD 102 to provide additional panoramic image capture of the environment. In one embodiment, front facing camera (RCG, and/or depth cameras) may be used to track position and pose, and motions of hands or gloves of the user. As will be described below, information from the image data captured by the front facing cameras can be used to provide finer resolution and otherwise improved haptic feedback to the user when interfacing with virtual objects.

Figure 3:
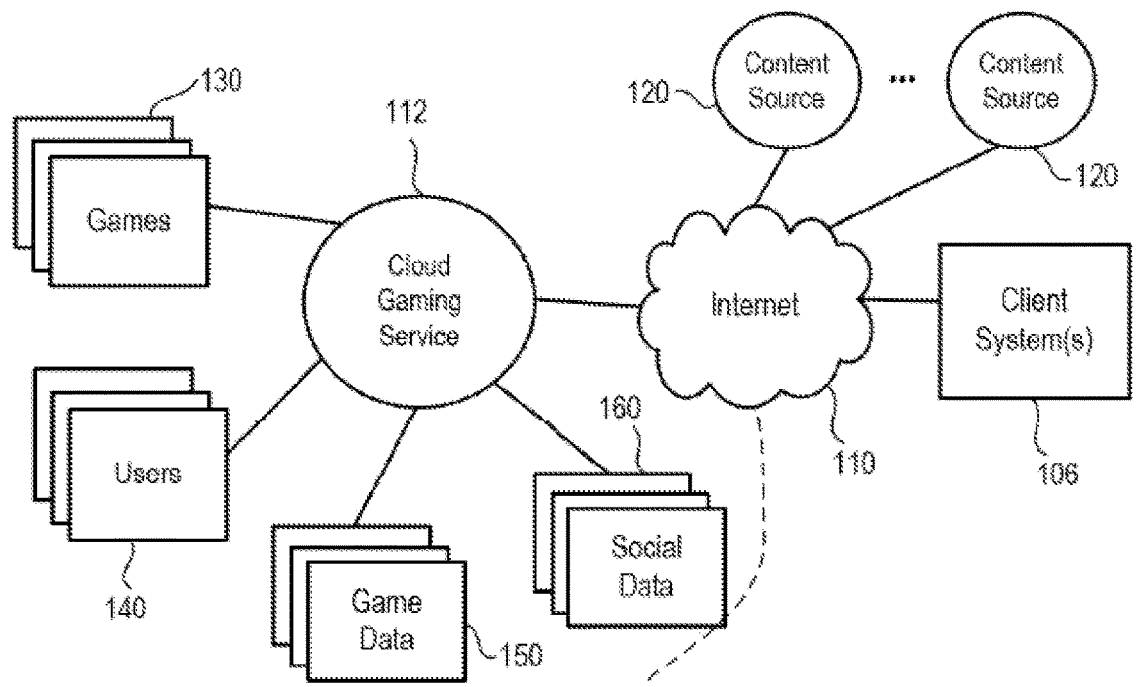
FIG. 3 illustrates one example of gameplay using the client system that is capable of rendering the video game content to the HMD of a user.
Figure 3:
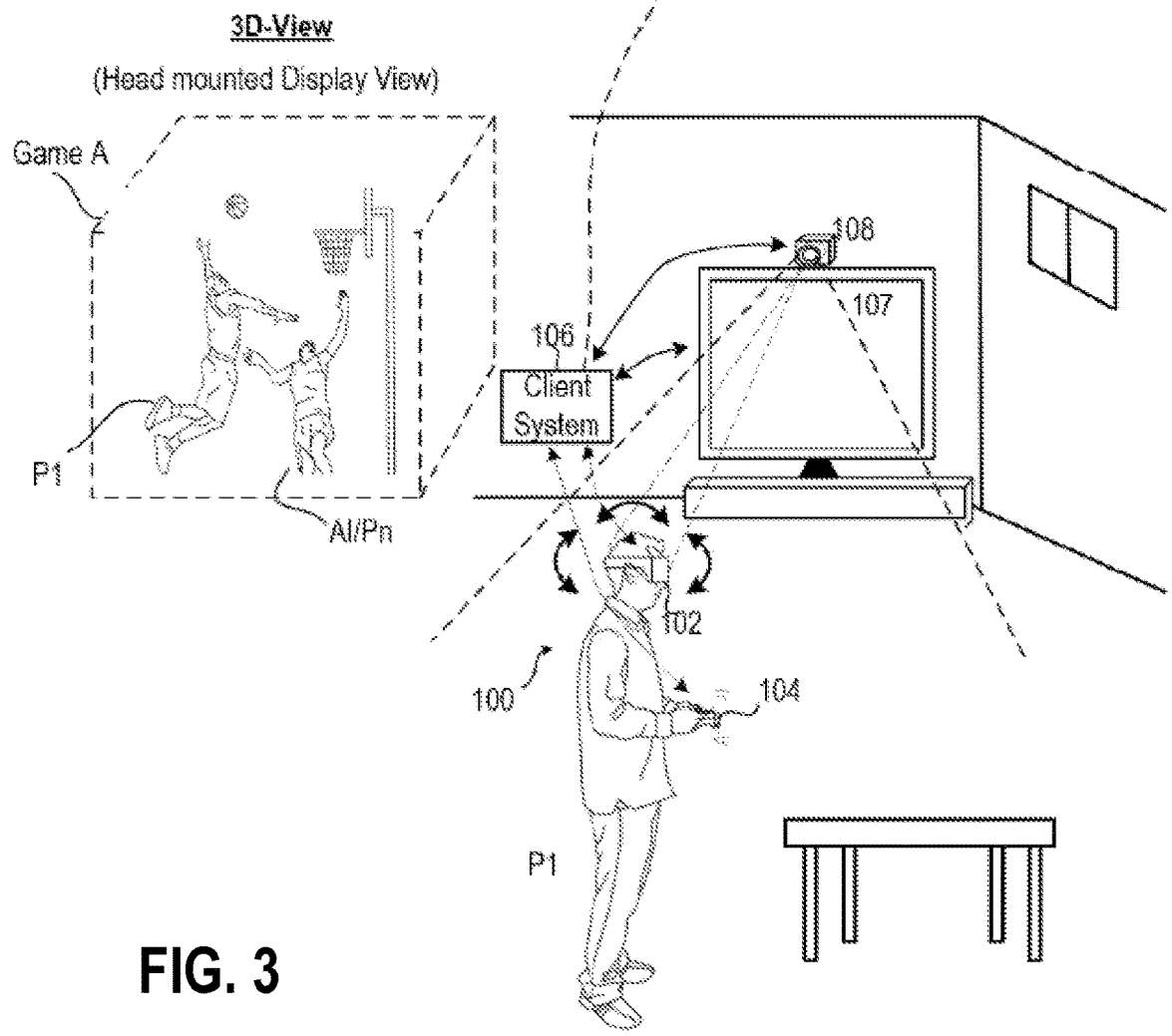

FIG. 3 illustrates one example of gameplay using the client system 106 that is capable of rendering the video game content to the HMD 102 of user 100. In this illustration, the game content provided to the HMD 102 is in a rich interactive 3-D space. As discussed above, the game content may be downloaded to the client system 106 or may be executed in one embodiment by a cloud processing system. Cloud gaming service 112 may include a database of users 140, which are allowed to access particular games, share experiences with other friends, post comments, and manage their account information.

The cloud gaming service 112 may also store game data 150 for specific users, which may be usable during gameplay, future gameplay, sharing to a social media network, or for storing trophies, awards, status, ranking, etc. Social data 160 may also be managed by cloud gaming service 112. The social data 160 may be managed by a separate social media network, which may be interfaced with cloud gaming service 112 over the Internet 110. Over the Internet 110, any number of client systems 106 may be connected for access to the content and interaction with other users.

Continuing with the example of FIG. 3, the three-dimensional interactive scene viewed in the HMD 102 may include gameplay, such as the characters illustrated in the 3-D view. One character, e.g. P1, may be controlled by the user 100 that is wearing the HMD 102. This example shows a basketball scene between two players, wherein the HMD user 100 is dunking a ball on another character in the 3-D view. The other character may be an AI (artificial intelligence) character of the game, or may be controlled by another user or users (Pn). User 100, who is wearing the HMD 102 is shown moving about in a space of use, wherein the HMD may move around based on the user's head movements and body positions. The camera 108 is shown positioned over a display screen in the room, however, for HMD 102 use, the camera 108 may be placed in any location that may capture images of the HMD 102. As such, the user 100 is shown turned at about 90 degrees from the camera 108 and the display 107, as content rendered in the HMD 102 may be dependent on the direction that the HMD 102 is positioned, from the perspective of the camera 108. Of course, during HMD 102 use, the user 100 will be moving about, turning his head, looking in various directions, as may be needed to take advantage of the dynamic virtual scenes rendered by the HMD.

Figure 4:
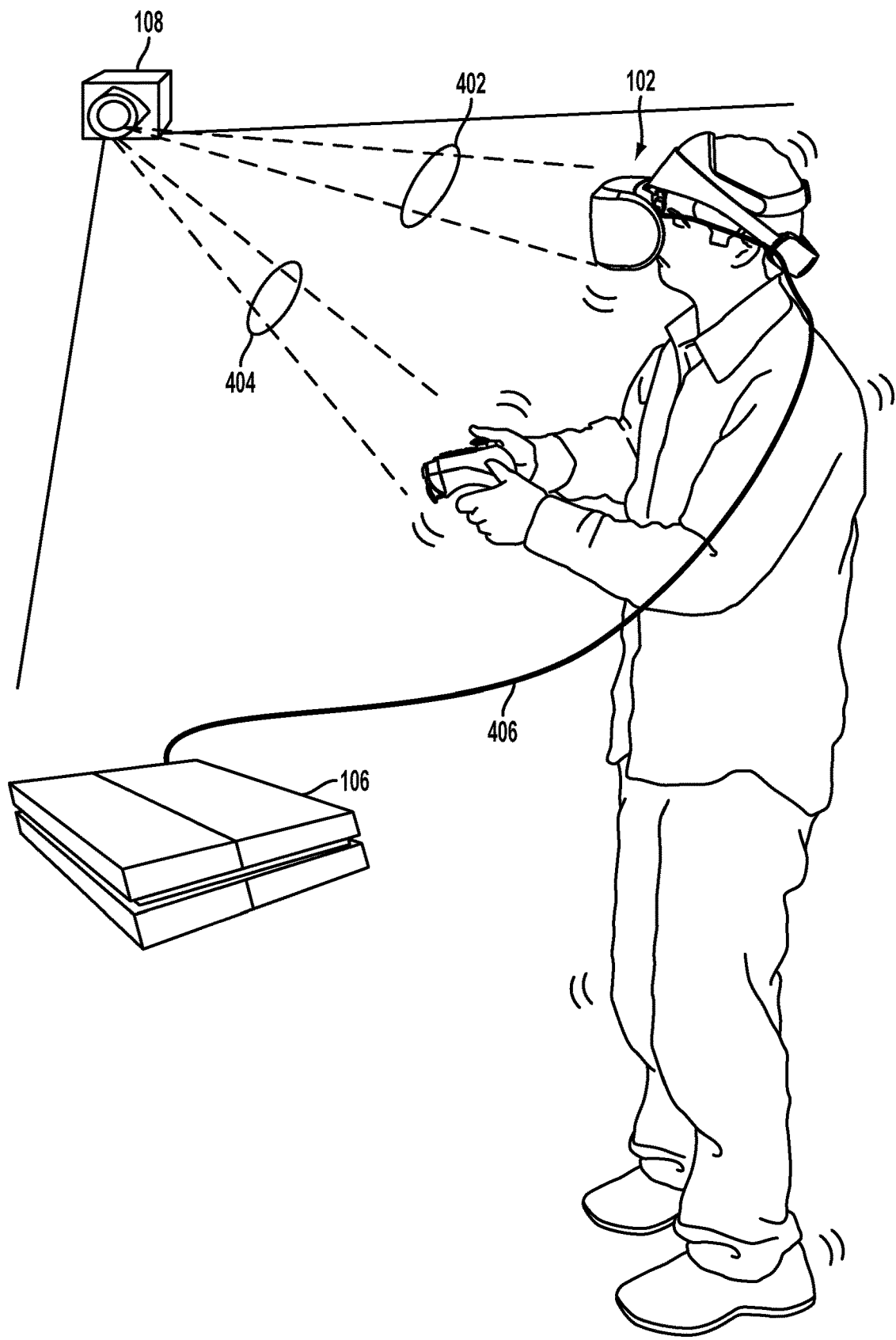
FIG. 4 illustrates a user wearing the HMD, during use, in accordance with the disclosed embodiments.

FIG. 4 illustrates a user wearing the HMD 102, during use, in accordance with the disclosed embodiments. In this example, it is shown that the HMD 102 is tracked 402 using an outside in tracking process where the camera 108 is tracking the HMD 102 location. The camera 108 is tracking the HMD 102 location using image data obtained from captured video frames by the camera 108. In other embodiments, tracking can also or alternatively utilize inertial data from the HMD itself. In various embodiments, tracking the user's head/HMD can include blended data obtained from image tracking and inertial tracking. Additionally, it is shown that the controller may also be tracked 404 using image data obtained from captured video frames by the camera 108. Also shown is the configuration where the HMD 102 is connected to the computing system 106 via a cable 406. In one embodiment, the HMD 102 obtains power from the same cable or may connect to another cable. In still another embodiment, the HMD 102 may have a battery that is rechargeable, so as to avoid extra power cords. In still other embodiments, the user's hands can be tracked, with or without gloves.

Figure 5:
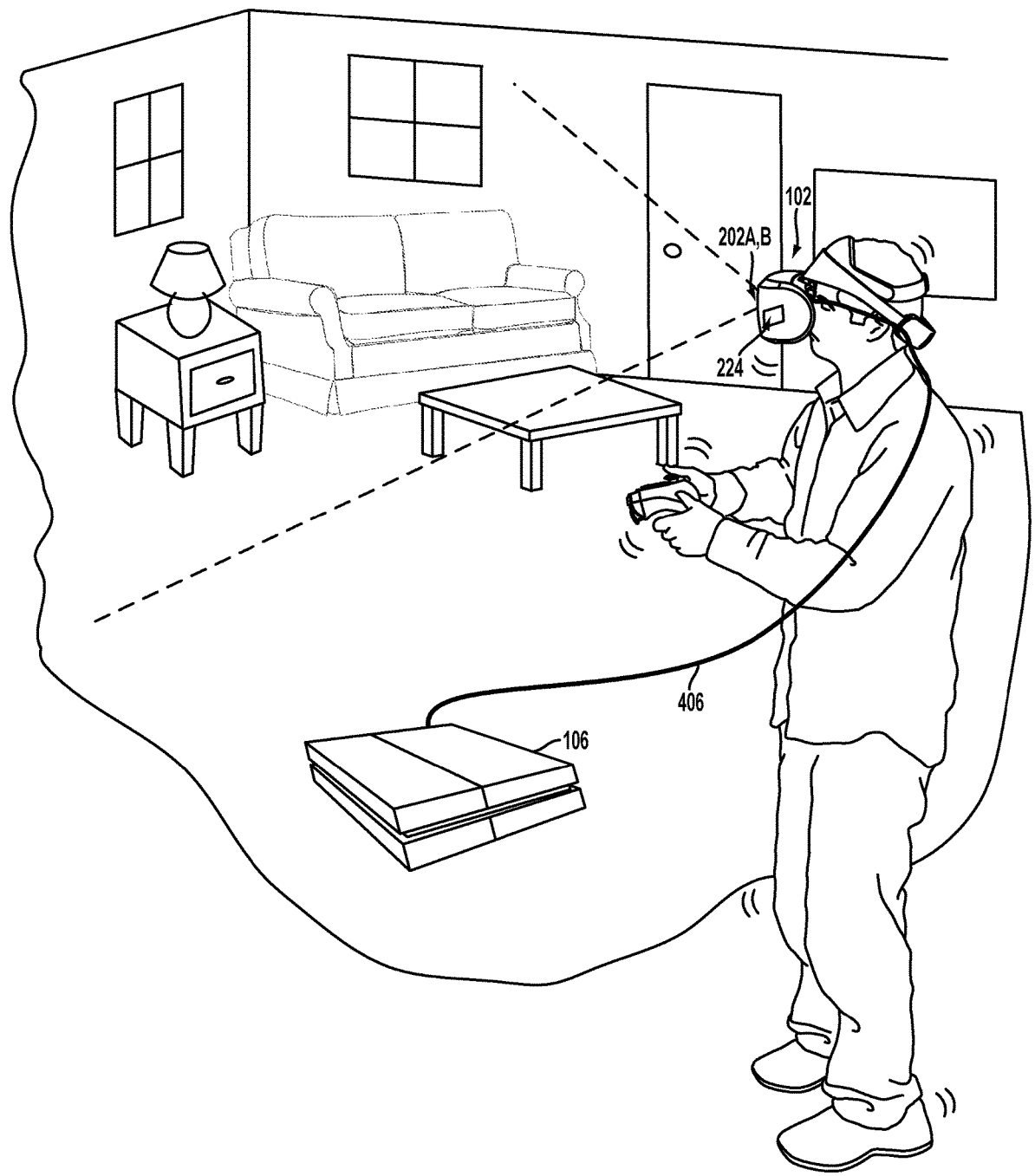
FIG. 5 illustrates a user wearing the HMD, during use in an inside out tracking process, in accordance with the disclosed embodiments.

FIG. 5 illustrates a user wearing the HMD 102, during use in an inside out tracking process, in accordance with the disclosed embodiments. In the inside out tracking process the HMD 102 location is tracked using image data obtained from captured video frames by one or more cameras 202A, 202B in the HMD 102.

Accurate tracking motion of the HMD 102 allows the computer 106 to predict and render appropriate additional virtual environment to the HMD so that the user experiences the transition between virtual scenes in the virtual environment in a substantially seamless manner as the user moves, turns or tips the HMD in one direction or another as the user is interacting with the virtual environment. If the motion of the HMD 102 is not detected accurately or quickly enough then the rendered virtual environment can appear delayed, unclear, jerky or otherwise inconsistent to the user.

In one embodiment, the computer 106 could render all of the virtual environment in all directions around the user. However, rendering the entire virtual environment in all directions requires substantial computing power and memory resources. In some embodiments a full space 360 degree in all directions is pre-rendered. However, dynamic content in all directions or additional content entering or leaving a scene may require real time computation. In some embodiments, the virtual environment will be rendered in advance so that the user can view the virtual environment in all directions. However, some content may need to be added dynamically, such as other moving characters, objects, moving icons, text or extensions of the virtual environment, e.g., such as when a user moves from place to place or from room to room. In other embodiments it may be more efficient and quicker for the computer 106 to render as little of the virtual environment as possible however enough of the virtual environment must be rendered to present a seamless experience to the user, as the user turns and moves through the virtual environment. This rendering would be real-time rendering based on where the user is viewing. Accurate detection of the movement of the HMD 102 allows the computer 106 to determine the additional virtual environment, render the additional virtual environment and present the additional virtual environment as the user moves or turns to able to see the virtual environment corresponding with movement of the user's head in the HMD.

As described above, the location and motion of the HMD 102 can be tracked by the computer 106 using image data from the fixed camera 108, image data from the cameras 202A, 202B in the HMD and one or more inertial sensors 224 included in the HMD and combinations thereof. A precise determination of the motion, position and pose of the HMD 102 allows the computer 106 to accurately predict and render the additional virtual environment on an as-needed basis corresponding to the user's moves and turns to see those additional portions of the virtual environment. In some embodiments additional content can be rendered and buffered with the predicted anticipation that the user will be turning his head in a predicted direction.

Figure 6:
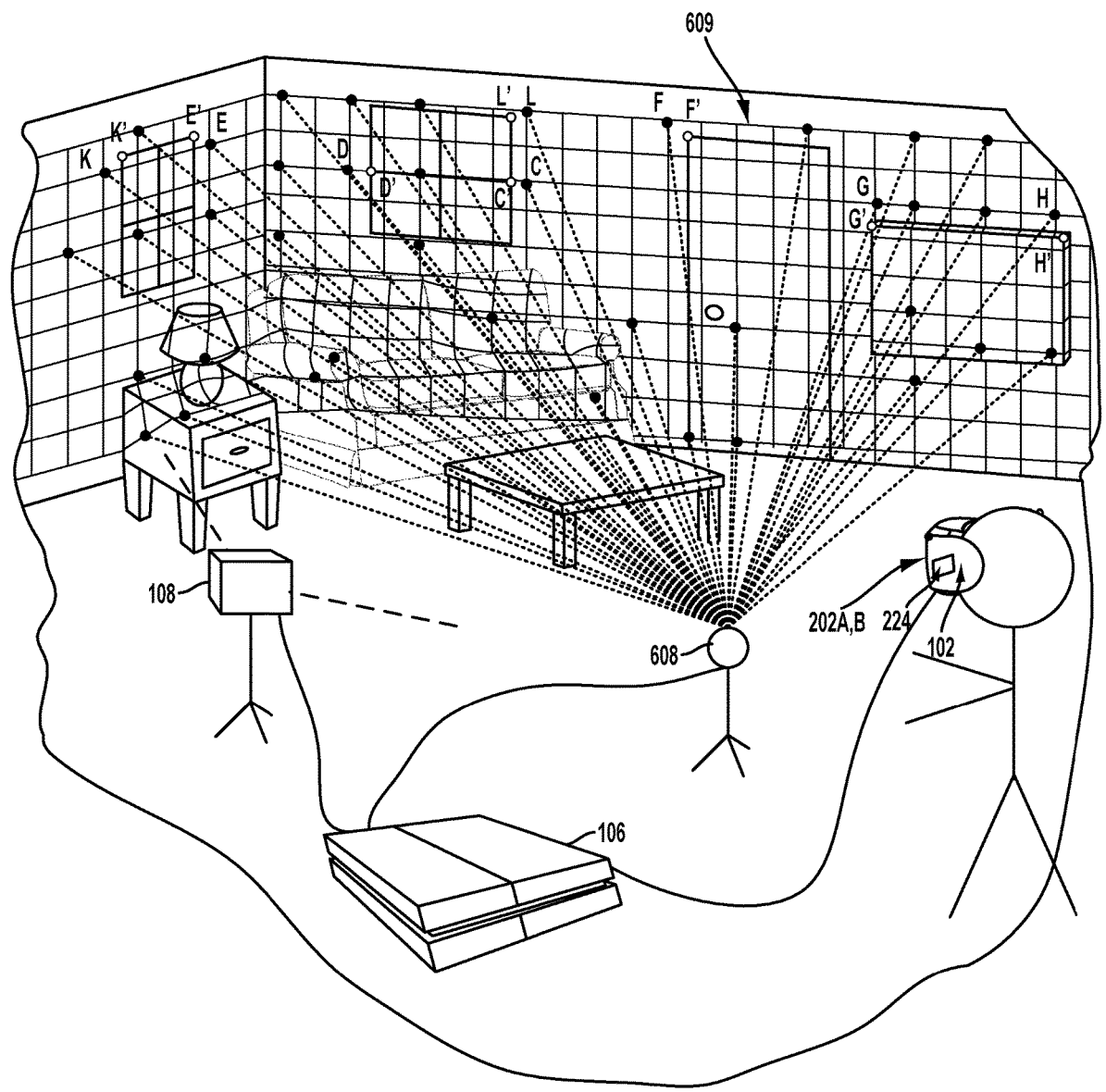
FIG. 6 illustrates a real space room where user is using an HMD, in accordance with the disclosed embodiments.

FIG. 6 illustrates a real space room where user is using an HMD 102, in accordance with the disclosed embodiments. One or more fixed emitters 608 can be a light source that can project multiple fixed points on the walls 602, 604, floor 606, ceiling (not shown) and the furniture 504-510 and other features such as windows 512, 514, doors 516, televisions 502, etc. of the real space room. The fixed points can be selected intersections of a projected grid 609. The emitters can be laser emitters capable of emitting visible and non-visible (e.g., infrared, ultraviolet) spectrum lasers. In some embodiments, the emitters can have filters to avoid harming human eyes. Alternatively, the fixed points can be projected points, shapes, symbols, codes, such as bar codes and quick reaction codes. Multiple emitters can be synchronized to produce multiple light outputs. Each of the multiple light outputs can be modulated or otherwise uniquely encoded. By way of example, each of the multiple light outputs can be modulated in time and frequency domain which can allow each projected point to be uniquely encoded. In one embodiment, the emitters can include two or more emitters in the real space and capable of emitting a laser light to cover the real space where the HMD will be moving within. The sensors in the HMD and or strap will capture light from the emitters that is reflected from one or more surfaces in the real space room, and the sensors that are triggered or detected to receive the reflected light are used to calculate the position, pose and movement of the HMD in the real space.

The camera 108 can perceive the fixed points in the grid pattern and identify intersecting points or other specific points within the grid pattern. It should be noted that the light source 608 can project the grid pattern 609 in a human visible spectrum or other human invisible portions of the electromagnetic spectrums such as microwave, ultraviolet, infrared or other portions of the electromagnetic spectrum.

The grid pattern can be projected continuously during use of the HMD 102. Alternatively, the grid pattern 609 can be projected temporarily or periodically to allow the computer 106 to map the real space room such as during a position and pose or calibration process that can occur at the beginning of the use of the HMD 102 and/or intermittently during the use of the HMD.

In another implementation multiple, time sequenced light projections where each of the multiple points can be projected for a period of time. By way of example, a first one of the multiple points can be projected for a first period of time and then a second one of the multiple points can be projected for a second period of time and so forth with subsequent ones of the multiple points being projected for corresponding times. Similarly, a first subset of the multiple points can be projected for a first time period and then a second subset of the multiple points can be projected for a second time period. The subsets can be separate and discrete or alternatively may overlap with shared projected points in one or more subsets. In yet another implementation, the projection of each of the multiple points can be coded in a time multiplexed on/off sequence. These changes in on/off illumination can happen at high frequencies (KHz or more) depending upon the types of sensors used to capture the light reflected from the projected points.

It should also be noted that the grid pattern 609 is illustrated as a rectangular grid having a selected distance between each of the grid lines. The rectangular grid pattern is merely exemplary in any suitable pattern such as triangles, or polygons, or trapezoids, or other shapes or a spherical pattern and combinations thereof can be used for the grid 609. The projected points on the real space room are not required to be regularly periodically spaced and can be irregularly spaced with the irregular spacing known to or can be determined by the computer 106.

The grid pattern 609 allows the computer 106 to analyze the image data from the fixed camera 108 and the cameras 202A, 202B, and/or other sensors such as PSDs in the HMD 102 to determine a precise or approximate position and pose or motion of the HMD by comparing corresponding angles light reflected from selected fixed points A-H in the grid pattern as the HMD is moved and as the position and pose of the HMD varies.

In one embodiment, the computer 106 can use the image data from the fixed camera 108 and the cameras 202A, 202B and other sensors such as photodiodes and photo sensors that can be mounted in the HMD 102 and/or the strap 210 of the HMD to determine relative locations of selected physical points A'-H' on physical objects in the real space room such as corners A'-E' of one or more windows 512, 514 or an intersection of lines on a piece of furniture 504-510 or other selected physical points on fixed objects 502, 516 in the real space room. The calculated points A'-H', can be used to determine a precise position and pose or motion of the HMD 102.

Figure 7A:
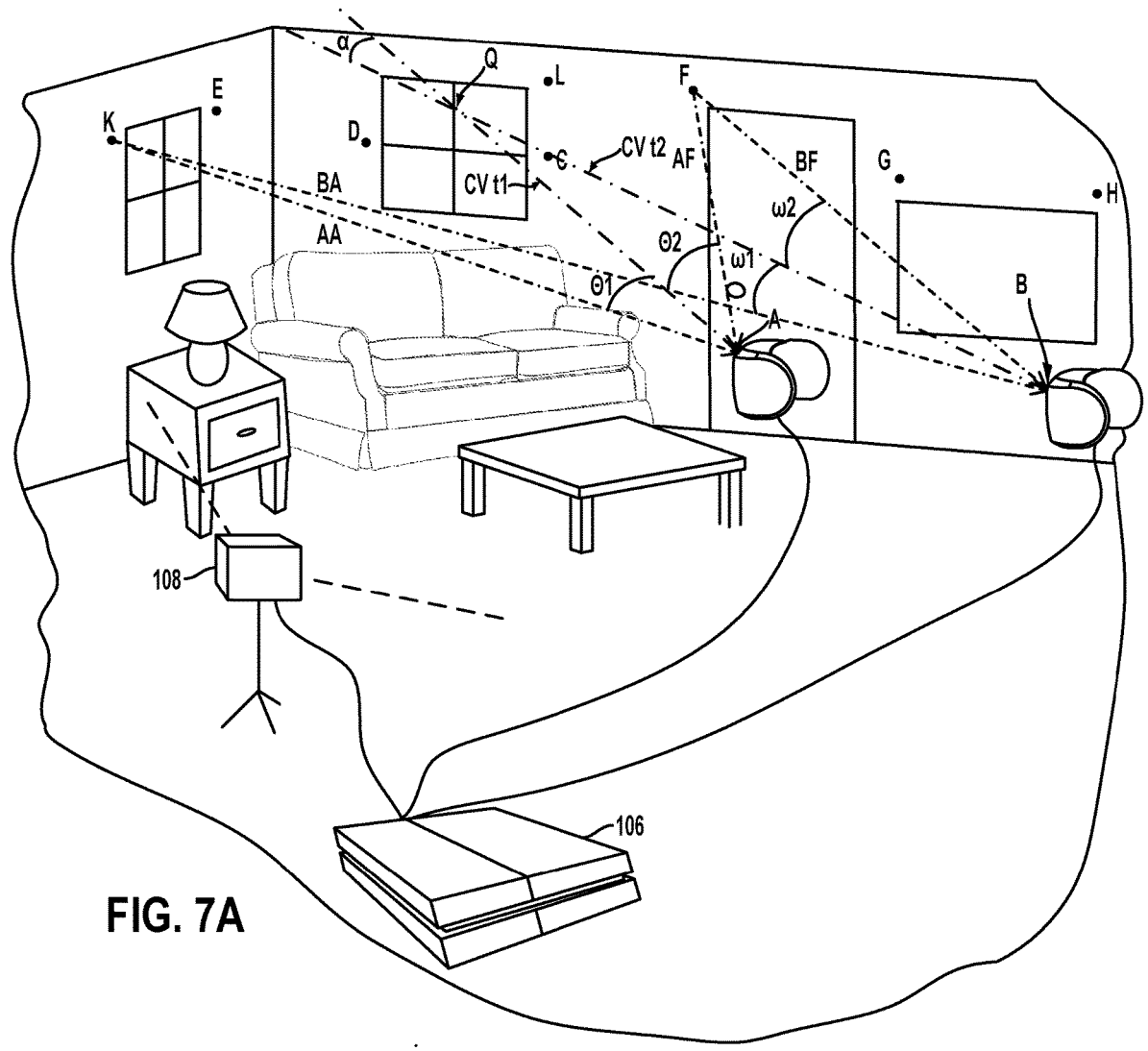
FIG. 7A illustrates a real space room where user is using an HMD, in accordance with the disclosed embodiments.
Figure 7B:
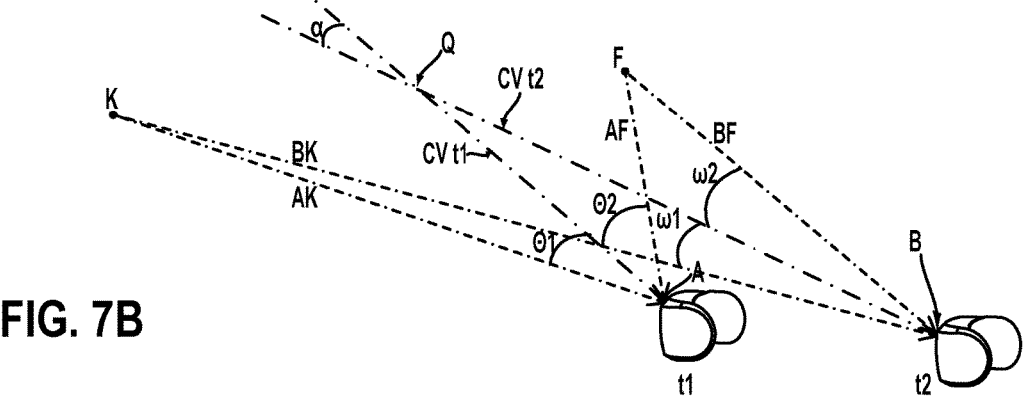
FIG. 7B is diagram of the HMD in two different locations and the vectors used to determine the location of the HMD, in accordance with the disclosed embodiments.

FIG. 7A illustrates a real space room where user is using an HMD 102, in accordance with the disclosed embodiments. FIG. 7B is diagram of the HMD 102 in two different locations and the vectors used to determine the location of the HMD, in accordance with the disclosed embodiments. The one or more of the cameras 202A, 202B, mounted in the HMD 102 can be stereo cameras although similar techniques could be used for multiple PSD sensors. The stereo cameras 202A, 202B can include an optical center through which a central view vector CV passes. The central view vector CV can be determined through calibration and the relationship between pixels and angular deflection.

The stereo cameras 202A, 202B can determine a distance (e.g., length AK) to a selected light spot, such as point K, using stereopsis. A pixel position relative to the center vector CV plus the distance between the camera and the selected point, such as length AK and AF, measured by stereopsis, provides the point position relative to the reference frame.

At a time t1, the HMD 102 is in a first location/orientation A. At least two labeled light points, such as points K and F, are in the view of the stereo cameras 202A, 202B. A central view vector CVt1 between the two points K and F can be determined in the camera's frame of reference at time t1.

At a time t2, the HMD 102 is moved to a new location/orientation B. The same two selected light points K and F are in the view of the stereo cameras 202A, 202B from location/orientation B. A central view vector CVt2, between light points K and F, can be determined in the camera's frame of reference at time t2.

At time t1, the HMD 102 is at location/orientation A and the camera's central view vector CVt1 as a major axis. The position of the selected point K is given by the distance $AK*\sin/\cos$ of the pixel angle $\Theta 1$.

The location/orientation A can be designated as the origin to determine the location/orientation B relative to the location/orientation A The central view vectors CVt1 and CVt2 intersect at point Q. An angular orientation change $\alpha$ of the HMD 102, between the central view vectors CVt1 and CVt2 can be determined. The angular orientation change $\alpha$ can be determined using the following trigonometric relationships of points K and F using the respective angles $\Theta 1$, $\Theta 2$, $\omega 1$, $\omega 2$ and $\alpha$.

$$Bx = (AK \sin \Theta 1)/BK(\sin \alpha * \cos \omega 1 + \cos \alpha * \sin \omega 1)$$

$$By = (AK \cos \Theta 1)/BK(\cos \alpha * \cos \omega 1 - \sin \alpha * \sin \omega 1)$$

Where AK is the length between the HMD 102 in position/orientation A, at time t1 and point K. BK is the length between the HMD 102 in position/orientation B, at time t2 and point K. Bx is the X coordinate and By is the Y coordinate of the HMD 102 in position/orientation B at time t2, relative to position/orientation A at time t1.

The above calculation can also be applied to determine the location/orientation of the HMD in location/orientation A relative to location/orientation B. Calculating both can provide a more accurate location/orientation of the HMD.

In another implementation more than two points can be selected. By way of example points K, F and L can be analyzed from each of the position/orientation A and B and the respective times t1 and t2. More than three points can also be selected. The number of points selected is limited only by the number of points available to choose and the processing time required to perform the corresponding calculations. Using more than two points can also improve the accuracy of determining the location/orientation of the HMD. The location/orientation of the HMD can also use accelerometer data to add further precision to the calculation.

In one implementation, time sequential coding can be used to uniquely identify the points. The above technique can be modified to account for the time difference for sequentially selected points. Using the above processes, a model of the features such as the light points is built over time and then for each frame the sensors 202A, B can detect, the algorithm makes a best effort match to that model based around plausible changes from a previous measurement and calculation.

Figure 8:
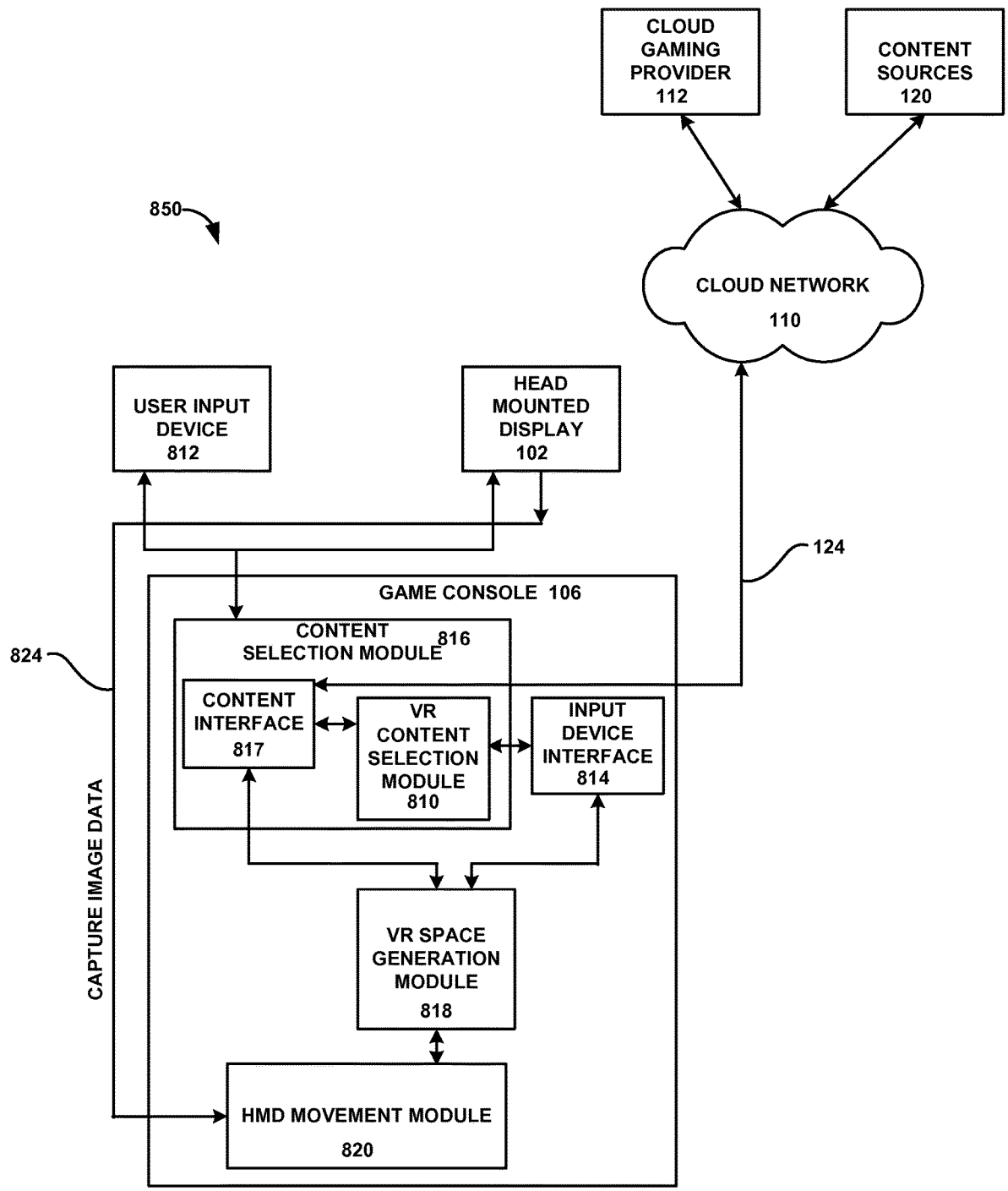
FIG. 8 is a simplified schematic of a system for tracking movement and position and pose of the HMD, in accordance with the disclosed embodiments.

FIG. 8 is a simplified schematic of a system 850 for tracking movement, position and pose of the HMD 102, in accordance with the disclosed embodiments. The system 850 includes a game console 106 coupled to a cloud network 110 and a cloud gaming provider 112 and content sources 120. The game console 106 is also coupled to the head mounted display 102, other peripheral devices such as user input device 812. (e.g., gloves, controller, motion controllers, inertial sensors, light controllers, magnetic controllers, etc.)

The game console 106 includes a content selection module 816, an input device interface 814, a VR space generation module 818 and HMD movement module 820. The content selection module 816 includes a content interface 817 and a virtual reality content selection module 810.

In operation the content interface 817 receives virtual reality content from various content sources 120. The content selection module 810 selects the appropriate portions of the virtual reality content from the content interface 817 according to inputs received from various input devices through the input device interface 814 and the HMD movement module 820. As an example, when the user turns the HMD in a direction to the left, the HMD movement module 820 receives an input from one or more sensors on the HMD and/or from a camera external from and directed toward the HMD that detects the movement of the HMD toward the left and provide that left turning data to the VR content selection module 810. The VR content selection module 810 selects corresponding VR content in the content interface 817. The content interface 817 outputs the selected VR content to the VR space generation module 818. The VR space generation module 818 generates the virtual environment or space presented in the HMD 102 as described in FIG. 8A above.

Figure 9:
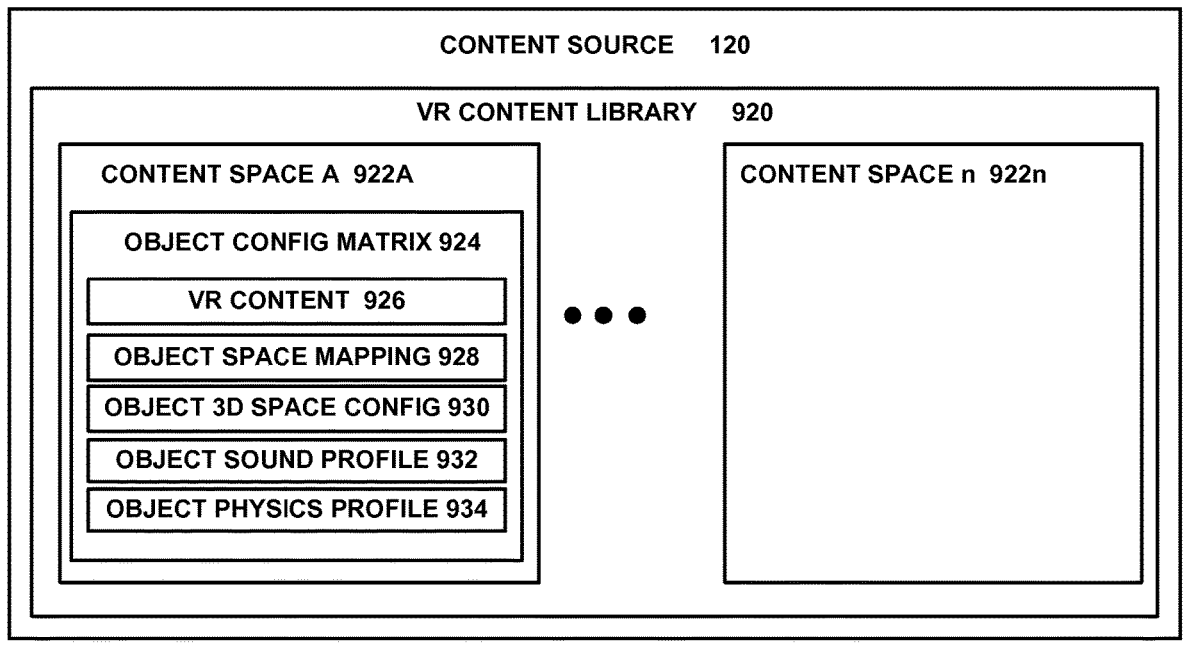
FIG. 9 is a simplified schematic of the content source, in accordance with the disclosed embodiments.

FIG. 9 is a simplified schematic of the content source 120, in accordance with the disclosed embodiments. The content source 120 includes several modules including a VR content library 920. Multiple content spaces 922A-n are included within the VR content library 920. VR content 926 provides the data needed by the VR content selection module 810 to define the virtual space displayed on the HMD 102. The object space mapping module 828 defines the location of the various virtual objects displayed in the virtual space.

The object 3D space configuration module 930 provides the 3D features of the displayed objects. These 3D features can include weight, shapes, textures and colors of the displayed object.

The object sound profile 932 provides sounds corresponding to the displayed virtual objects and the virtual space. For example, the sound of wind rustling the leaves of the trees, distant thunder, and animal sounds present in the virtual space displayed on the HMD. The object physics profile 934 provides the physical motion and texture characteristics of the various objects displayed in the virtual space. Each of the motion, texture, sound, position and pose, and location of the objects is played within the virtual space are used by the VR content selection module 810 and the VR space generation module to generate the objects in the VR space displayed on the HMD 102.

Figure 10:
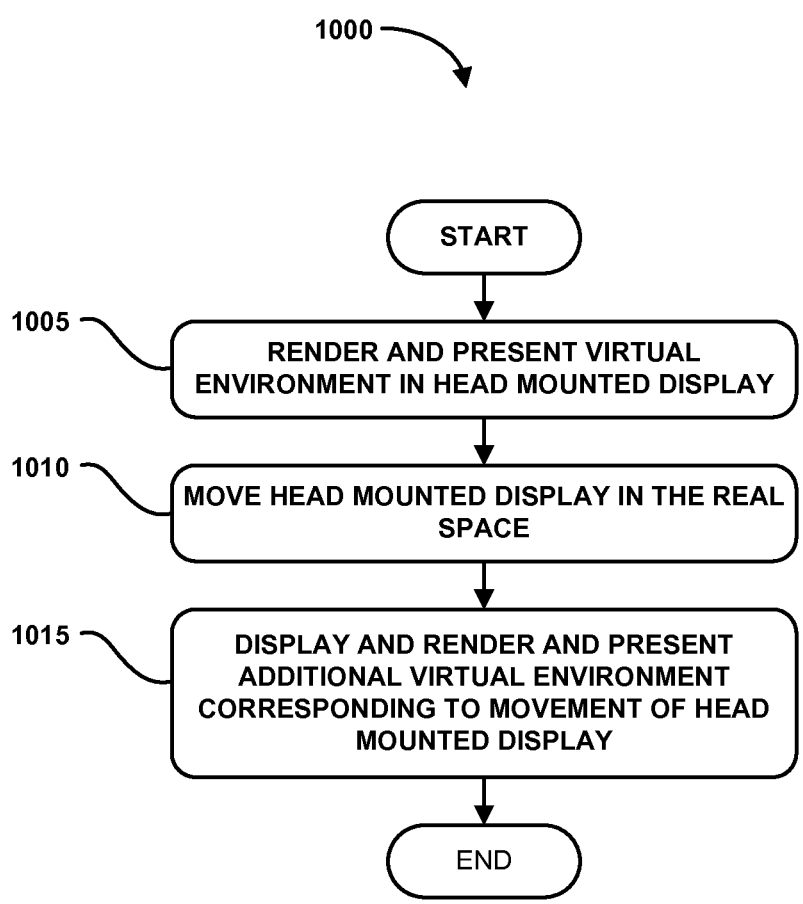
FIG. 10 is a flowchart diagram that illustrates the method operations performed in tracking movement of the HMD, in accordance with the disclosed embodiments.

FIG. 10 is a flowchart diagram that illustrates the method operations 1000 performed in tracking movement of the HMD 102, in accordance with the disclosed embodiments. In an operation 1005, the virtual space is presented to the user through the HMD 102. The various virtual objects present in the virtual space are also displayed to the user. In an operation 1010, the HMD is moved in the real space. As an example, the user can turn the HMD to the left or right.

In an operation 1015, the game console 106 provides the additional virtual environment corresponding to the movement of the HMD. This provides the user with a smooth scanning sensation as the virtual environment is presented to the user as he turns and moves within the virtual environment. In one embodiment, the perception to the user is as if the virtual space around him was fully rendered.

Figure 11:
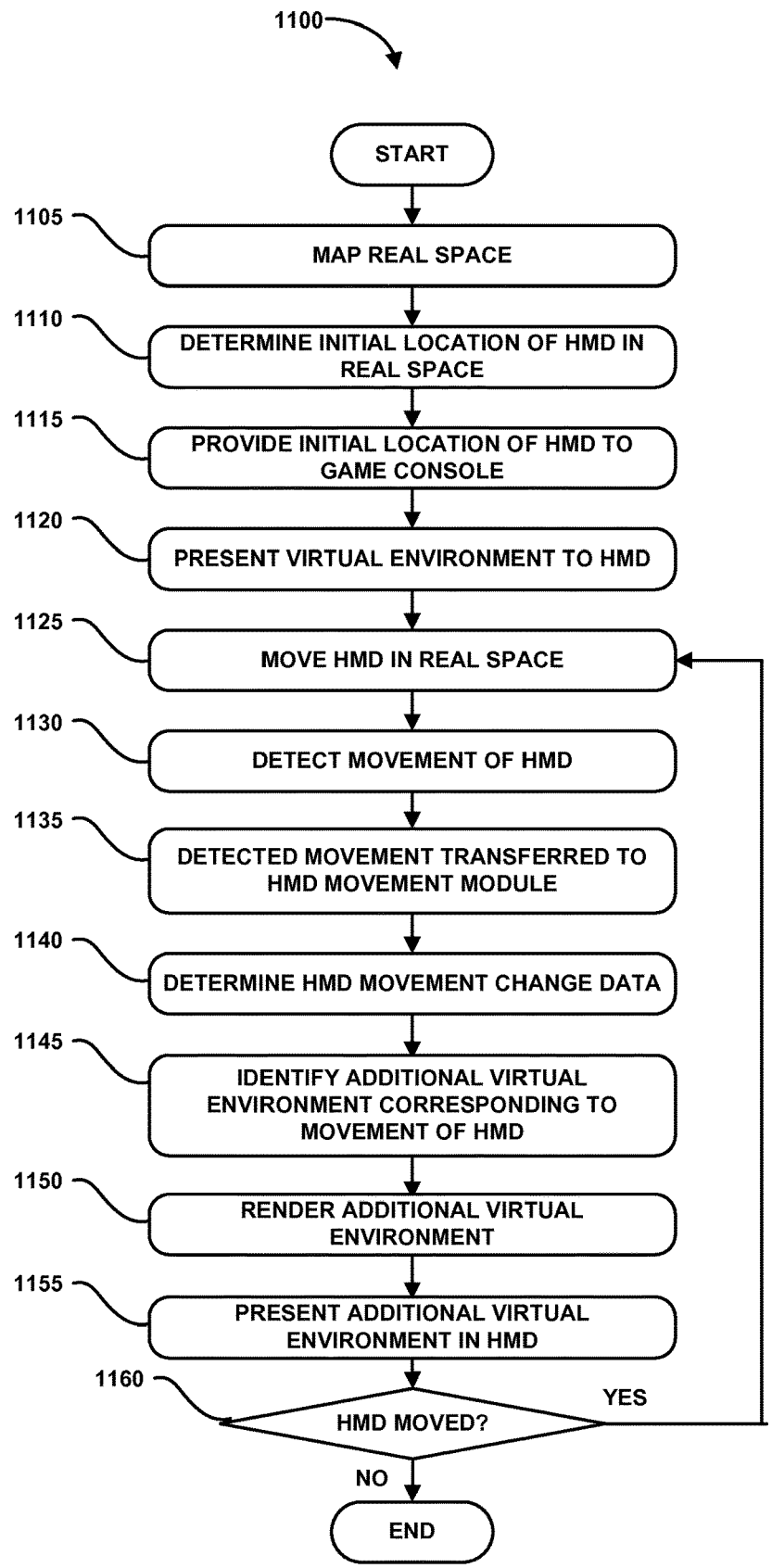
FIG. 11 is a more detailed flowchart diagram that illustrates the method operations performed in tracking movement of the HMD, in accordance with the disclosed embodiments.

FIG. 11 is a more detailed flowchart diagram that illustrates the method operations 1100 performed in tracking movement of the HMD 102, in accordance with the disclosed embodiments. In an operation 1105, the real space is mapped. The real space is the room or other space where the HMD 102 is to be used. The real space can be mapped by identifying multiple fixed points on the surfaces of the real space such as described in FIGS. 6A and 6B.

In an operation 1110, an initial position and pose of the HMD is determined. The HMD initial position and pose is determined relative to the selected fixed points in the real space. The initial position and pose of the HMD is provided to the game console 106 in an operation 1115. The initial position and pose of the HMD includes one or more images captured by a camera or inertial sensors mounted or other sensors such as photo detectors and photo diodes mounted on the HMD.

In an operation 1120, a virtual environment is presented to a user. The virtual environment may be presented through the HMD 102. The virtual environment presented through the HMD 102 corresponds to the initial position and pose of the HMD.

In an operation 1125, the HMD 102 is moved relative to the real space such as the user turning or tipping or stepping forward or back in the real space. In an operation 1130, the movement of the HMD is detected. The movement of the HMD can be detected by one or more processes including an inside out process including capturing one or more images as the HMD is moved. The images can be captured by a camera integral to the HMD.

In an operation 1135, the detected motion of the HMD is transmitted to the HMD movement module. The HMD movement module 820 determines a difference between the presently captured image and at least one previously captured image to determine a HMD movement change data that is output to the VR space generation module 818 in an operation 1140.

In an operation 1145, the VR space generation module identifies the additional virtual environment to be rendered and presented on the HMD and outputs the identified additional virtual environment to the content interface 817 in the content selection module 816. In an operation 1150, the content selection module 816 renders the additional virtual environment and presents the rendered additional virtual environment to the HMD in an operation 1155. By way of example, as the HMD is turned or moved the additional virtual environment is presented on the HMD display so that the movement of the HMD in real space smoothly corresponds the movement of the HMD in the virtual environment.

Continued operation of the movement of the HMD continues in operations 1125-1155 as described above. The method operations can end when the HMD is no longer in motion in the real space.

Figure 12:
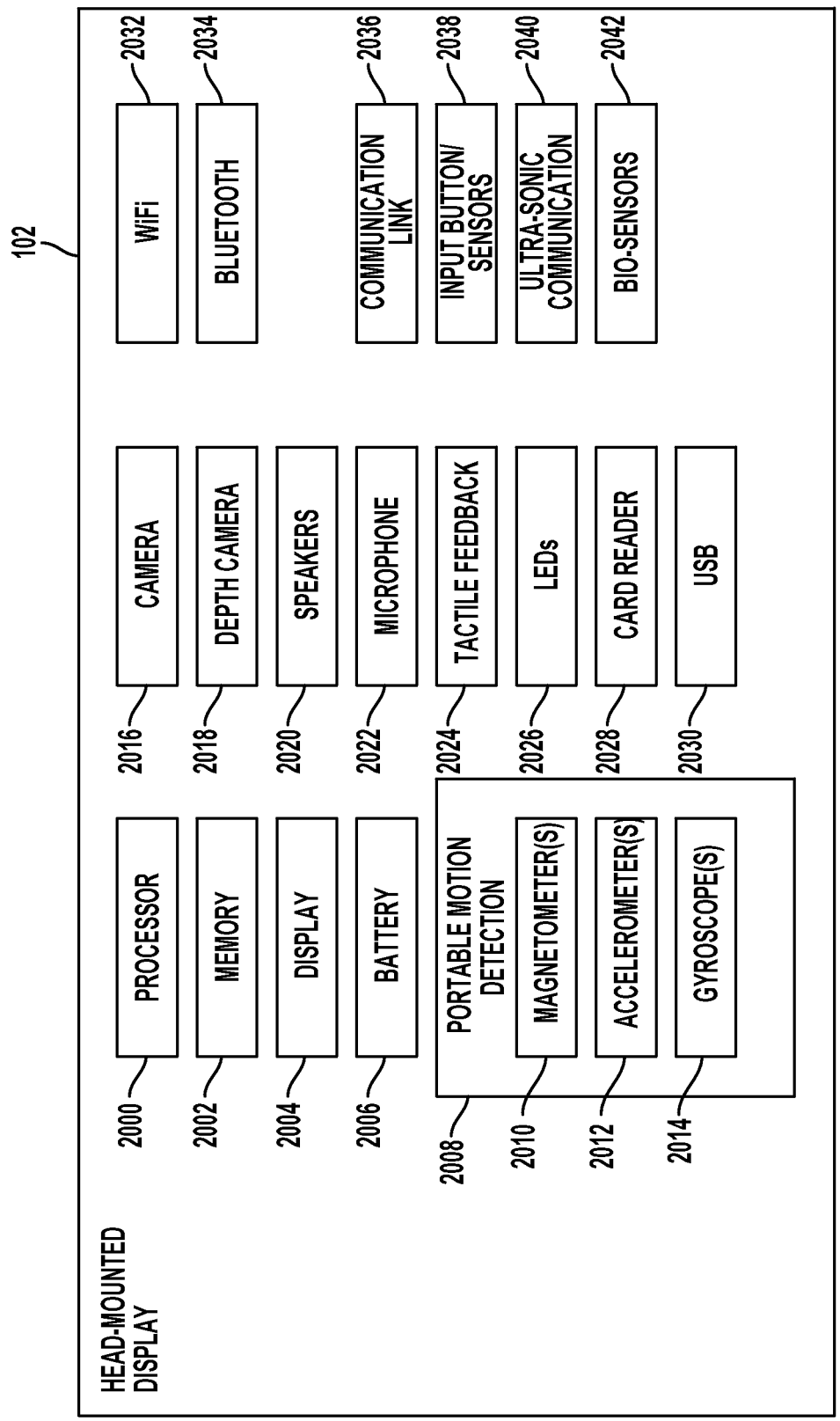
FIG. 12 is a diagram is shown illustrating example components of a head-mounted display, in accordance with the disclosed embodiments.

With reference to FIG. 12, a diagram is shown illustrating example components of a head-mounted display 102, in accordance with the disclosed embodiments. It should be understood that more or less components may be included or excluded from the HMD 102, depending on the configuration and functions enabled. The head-mounted display 102 may include a processor 2000 for executing program instructions. A memory 2002 is provided for storage purposes, and may include both volatile and non-volatile memory. A display 2004 is included which provides a visual interface that a user may view.

The display 2004 may be defined by one single display, or in the form of a separate display screen for each eye. When two display screens are provided, it is possible to provide left-eye and right-eye video content separately. Separate presentation of video content to each eye, for example, may provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, may be the left-eye video feed, but in other embodiments it may be the right-eye video feed.

A battery 2006 may be provided as a power source for the head-mounted display 102. In other embodiments, the power source may include an outlet connection to power. In other embodiments, an outlet connection to power and a battery 2006 may be provided. A motion detection module 2008 may include any of various kinds of motion sensitive hardware, such as a magnetometer 2010, an accelerometer 2012, and a gyroscope 2014.

An accelerometer 2012 is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2012 are used to provide the direction of gravity, which gives an absolute reference for two angles (world-space pitch and world-space roll).

A magnetometer 2010 measures the strength and direction of the magnetic field in the vicinity of the head-mounted display. In one embodiment, three magnetometers 2010 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp may be calibrated using information from other sensors such as the gyroscope or the camera. In one embodiment, accelerometer 2012 is used together with magnetometer 2010 to obtain the inclination and azimuth of the head-mounted display 102.

A gyroscope 2014 is a device for measuring or maintaining position and pose, based on the principles of angular momentum. In one embodiment, three gyroscopes 2014 provide information about movement across the respective axis (x, y and z) based on inertial sensing. The gyroscopes help in detecting fast rotations. However, the gyroscopes may drift overtime without the existence of an absolute reference. This requires resetting the gyroscopes periodically, which may be done using other available information, such as position and pose determination based on visual tracking of an object, accelerometer, magnetometer, etc.

A camera 2016 is provided for capturing images and image streams of a real environment. More than one camera (optionally) may be included in the HMD 102, including a camera that is rear-facing (directed away from a user when the user is viewing the display of the HMD 102), and a camera that is front-facing (directed towards the user when the user is viewing the display of the HMD 102). Additionally, a depth camera 2018 may be included in the HMD 102 for sensing depth information of objects in a real environment.

The HMD 102 includes speakers 2020 for providing audio output. Also, a microphone 2022 may be included for capturing audio from the real environment, including sounds from the ambient environment, speech made by the user, etc. The HMD 102 includes tactile feedback module 2024 for providing tactile feedback to the user. In one embodiment, the tactile feedback module 2024 is capable of causing movement and/or vibration of the HMD 102 so as to provide tactile feedback to the user.

LEDs 2026 are provided as visual indicators of statuses of the head-mounted display 102. For example, an LED may indicate battery level, power on, etc. A card reader 2028 is provided to enable the head-mounted display 102 to read and write information to and from a memory card. A USB interface 2030 is included as one example of an interface for enabling connection of handheld peripheral devices, or connection to other devices, such as other portable devices, computers, etc. In various embodiments of the HMD 102, any of various kinds of interfaces may be included to enable greater connectivity of the HMD 102.

A WiFi module 2032 may be included for enabling connection to the Internet via wireless networking technologies. Also, the HMD 102 may include a Bluetooth module 2034 for enabling wireless connection to other devices. A communications link 2036 may also be included for connection to other devices. In one embodiment, the communications link 2036 utilizes infrared transmission for wireless communication. In other embodiments, the communications link 2036 may utilize any of various wireless or wired transmission protocols for communication with other devices.

Input buttons/sensors 2038 are included to provide an input interface for the user. Any of various kinds of input interfaces may be included, such as buttons, gestures, touchpad, joystick, trackball, etc. An ultra-sonic communication module 2040 may be included in HMD 102 for facilitating communication with other devices via ultra-sonic technologies.

Bio-sensors 2042 are included to enable detection of physiological data from a user. In one embodiment, the bio-sensors 2042 include one or more dry electrodes for detecting bio-electric signals of the user through the user's skin, voice detection, eye retina detection to identify users/profiles, etc.

The foregoing components of HMD 102 have been described as merely exemplary components that may be included in HMD 102. In various embodiments of the invention, the HMD 102 may or may not include some of the various aforementioned components. Embodiments of the HMD 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous users (e.g., P1, P2, . . . Pn). Each of these users may receive or share a video stream, or a single video stream may include regions of a frame generated specifically for each player, e.g., generated based on each user's point of view. Any number of clients may be local (e.g., co-located) or are geographically dispersed. The number of clients included in a game system may vary widely from one or two to thousands, tens of thousands, or more. As used herein, the term "game player" or "user" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD may be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content may be rendered so long as it may be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic may produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client may be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 13:
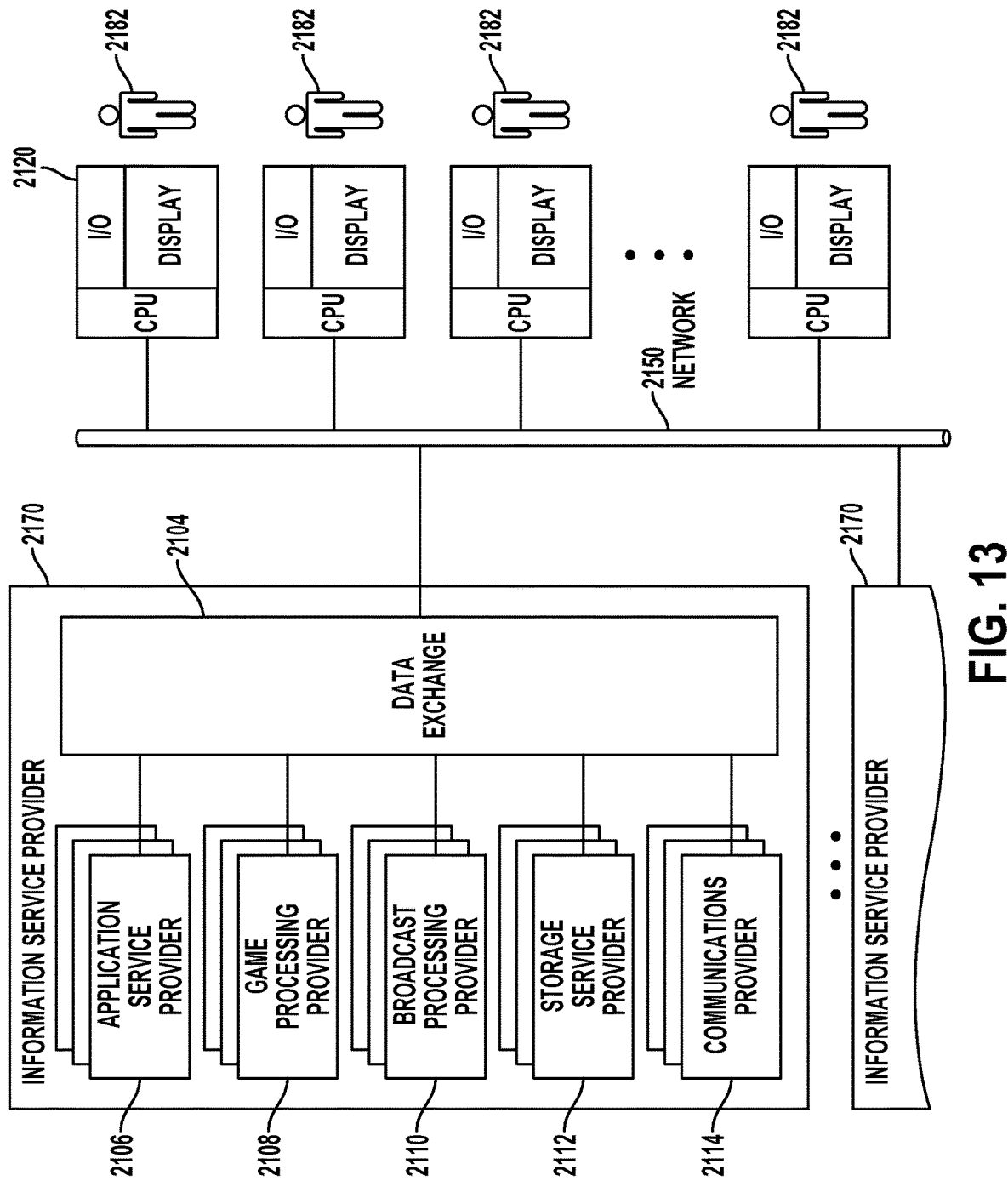
FIG. 13 illustrates an embodiment of an Information Service Provider architecture.

FIG. 13 illustrates an embodiment of an Information Service Provider architecture. Information Service Providers (ISP) 2170 delivers a multitude of information services to users 2182 geographically dispersed and connected via network 2150. An ISP may deliver just one type of service, such as stock price updates, or a variety of services such as broadcast media, news, sports, gaming, etc. Additionally, the services offered by each ISP are dynamic, that is, services may be added or taken away at any point in time. Thus, the ISP providing a particular type of service to a particular individual may change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2170 includes Application Service Provider (ASP) 2106, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing may be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2170 includes a Game Processing Server (GPS) 2108 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2110 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content may reach almost any country in the world.

Storage Service Provider (SSP) 2112 provides computer storage space and related management services. SSPs also offer periodic backup and archiving. By offering storage as a service, users may order more storage as required. Another major advantage is that SSPs include backup services and users will not lose all their data if their computers' hard drives fail. Further, a plurality of SSPs may have total or partial copies of the user data, allowing users to access data in an efficient way independently of where the user is located or the device being used to access the data. For example, a user may access personal files in the home computer, as well as in a mobile phone while the user is on the move.

Communications Provider 2114 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider may also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2104 interconnects the several modules inside ISP 2170 and connects these modules to users 2182 via network 2150. Data Exchange 2104 may cover a small area where all the modules of ISP 2170 are in close proximity, or may cover a large geographic area when the different modules are geographically dispersed. For example, Data Exchange 2104 may include a fast Gigabit Ethernet (or faster) within a cabinet of a data center, or an intercontinental virtual area network (VLAN).

Users 2182 access the remote services with client device 2120, which includes at least a CPU, a display and I/O. The client device may be a PC, a mobile phone, a netbook, tablet, gaming system, a PDA, etc. In one embodiment, ISP 2170 recognizes the type of device used by the client and adjusts the communication method employed. In other cases, client devices use a standard communications method, such as html, to access ISP 2170.

Embodiments of the present invention may be practiced with various computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a wire-based or wireless network.

With the above embodiments in mind, it should be understood that the invention may employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention may also be embodied as computer readable code on a computer readable medium. The computer readable medium is any data storage device that may store data, which may be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium may include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method for tracking a head mounted display (HMD) used for rendering a virtual reality scene, the HMD including a display screen for rendering the virtual reality scene, the method comprising:

capturing image data using an infrared camera facing out of an external surface of the HMD, the image data capturing a real space in which the HMD is located;

processing frames of the image data to identify at least two points of light projected from an infrared emitter that is fixed in the real space and is separate from said HMD upon a surface in the real space as reference points, the real space having real-world objects disposed in and around an area of interactivity and the at least two points of light;

identifying changes in location of the at least two points of light in the captured image data, the changes in location in compared frames of said image data being associated to position and pose changes by the HMD in the real space;

wherein the position and pose changes are configured to automatically control rendering adjustments to the virtual reality scene presented on the display screen of the HMD, the adjustments including changes in a view perspective into of the virtual reality scene and rendering of additional content for the virtual reality scene;

wherein said additional content of the virtual reality scene is rendered for said changes in the view perspective into the virtual reality scene based on analysis of the points of light captured by the infrared camera facing out of the external surface of the HMD.

2. The method of claim 1, wherein the capturing is performed at a frame rate that continues while the tracking of the HMD is occurring.

3. The method of claim 1, wherein the processing is performed by a computing device that is connected to the HMD.

4. The method of claim 1, wherein the position and pose changes are determined by a computing device that is connected to the HMD and the computing device is configured to control the rendering of adjustments to the virtual reality scene rendered on the display screen of the HMD.

5. The method of claim 1, further comprising, additionally one or more of a red-green-blue (RGB) camera, a video camera, a depth camera, or a position sensing device (PSD) integrated on the external surface of the HMD.

6. The method of claim 1, wherein the infrared camera and the external surface is part of housing of the HMD or a strap of the HMD.

7. The method of claim 1, further comprising, examining inertial data of the HMD during the position and pose changes in the real space, the inertial data generated on the HMD to provide an additional tracking variable usable when automatically controlling rendering adjustments.

8. A head mounted display (HMD), comprising, a housing including a screen for displaying images associated with a virtual reality scene;

a infrared camera facing out of an external surface of the housing; and a processor for controlling capturing of image data by the infrared camera, the image data capturing a real space in which the HMD is located along with at least two points of light detected to be projected by an infrared emitter onto a surface of the real space as reference points, wherein the infrared emitter is located in the real space at a fixed location that is separate from the HMD, the real space having real-world objects disposed in and around an area of interactivity and the at least two points of light, the processor is configured to continually transfer the image data to a computing device during position tracking of the HMD in the real space, the processor configured to identify changes in position and pose of the HMD based on changes in location of the at least two points of light in compared frames of the image data, the processor is further configured to receive content for the virtual reality scene to be rendered on the screen based on the identified changes in position and pose;

wherein the changes in position and pose cause automatic adjustments to a view perspective into of the virtual reality scene and rendering of additional content for the virtual reality scene;

wherein said additional content of the virtual reality scene is rendered for changes in the view perspective into the virtual reality scene based on analysis of said at least two points of light captured by the infrared camera.

9. The HMD of claim 8, further comprising, an inertial sensor integrated with the housing, the inertial sensor providing motion data to the processor for determining one or more of position, position and pose or acceleration.

10. The HMD of claim 8, further comprising, additionally one or more of a camera, or a red-green-blue (RGB) camera, or a video camera, or a depth camera, or a position sensing device (PSD) disposed proximate to an external surface of the housing.

11. The method of claim 8, wherein the emitter is directed toward the surface.

\* \* \* \* \*